(12) United States Patent
Wachauer et al.

(10) Patent No.: US 6,398,685 B1
(45) Date of Patent: Jun. 4, 2002

(54) DRIVE MECHANISM FOR A VEHICLE, ESPECIALLY A MULTILANE ELECTROMOBILE

(75) Inventors: Oskar Wachauer, 39a, A-8795 Radmer; Sonja Wachauer, Radmer, both of (AT)

(73) Assignee: Oskar Wachauer, Radmer (AT)

( * ) Notice: Subject to any disclaimer, the term of this patent is extended or adjusted under 35 U.S.C. 154(b) by 0 days.

(21) Appl. No.: 09/581,555
(22) PCT Filed: Jan. 11, 1999
(86) PCT No.: PCT/AT99/00006
§ 371 Date: Jul. 27, 2000
(87) PCT Pub. No.: WO99/36286
PCT Pub. Date: Jul. 22, 1999

(30) Foreign Application Priority Data

Jan. 16, 1998 (AT) .............................................. A 59/98

(51) Int. Cl.[7] ........................... F16H 48/06; F16H 3/72; F16H 57/108; B60K 1/00
(52) U.S. Cl. ........................... 475/149; 475/6; 475/339; 180/65.6
(58) Field of Search ........................... 475/5, 6, 29, 30, 475/149, 152, 223, 224, 284, 338, 339; 180/65.5, 65.6

(56) References Cited

U.S. PATENT DOCUMENTS 1,348,657 A * 8/1920 Breitenbach ............. 475/149 X
2,876,657 A * 3/1959 Allin, Sr. et al. ............. 475/29

(List continued on next page.)

FOREIGN PATENT DOCUMENTS

| DE | 2606807 | 9/1977 | |
| DE | 4236093 | 4/1993 | |
| DE | 4421425 | 8/1995 | |
| EP | 587120 | 3/1994 | |
| EP | 567324 | 9/1998 | |
| JP | 52-450009 | 4/1977 | |
| JP | 6095238 | * 5/1985 | ..................... 475/6 |

OTHER PUBLICATIONS

Patent Abstracts of Japan, vol. 001, No. 112 (E–048).

*Primary Examiner*—Charles A Marmor
*Assistant Examiner*—Roger Pang
(74) *Attorney, Agent, or Firm*—Greenblum & Bernstein, P.L.C.

(57) ABSTRACT

An electric drive for a motor vehicle having a vehicle structure or vehicle frame is provided including a housing adapted to be fixed relative to the vehicle structure or vehicle frame, a motor frame rotatably mounted within the housing, and a stator and rotor being mounted for relative rotation and being located within the housing, the motor frame and the rotor are arranged to rotate in opposite directions for work output. The drive further includes a first driveline being connected to one of the rotor or the motor frame, wherein rotational movement of the one of the rotor or the motor frame is transmitted through a first transmission device coupled to the first driveline such that a first output of the first transmission device rotates in a same direction as the rotational movement of the one of the rotor and the motor frame, and a second driveline connected to the other of the rotor or the motor frame, wherein rotational movement of the other of the rotor or motor frame is transmitted through a second transmission device coupled to the second driveline such that a second output of the second transmission device rotates in a direction opposite the rotational movement at the other of the rotor and the motor frame, wherein each of the first and second transmission devices comprises planet gears including a planet cage and at least one planet gear set, whereby one of the rotor or the frame is connected via a shaft of the rotor or the motor frame, respectively, with the planet cage and move a planet axis of the at least one planet gear set.

24 Claims, 3 Drawing Sheets

U.S. PATENT DOCUMENTS

| | | | |
|---|---|---|---|
| 3,267,311 A | | 8/1966 | Lamparty |
| 3,799,284 A | * | 3/1974 | Hender .................... 475/5 X |
| 3,812,928 A | * | 5/1974 | Rockwell et al. ....... 475/149 X |
| 4,130,172 A | | 12/1978 | Moody |
| 4,803,897 A | * | 2/1989 | Reed ............................ 475/6 |
| 5,168,946 A | * | 12/1992 | Dorgan .................... 475/6 X |
| 5,408,169 A | | 4/1995 | Jeanneret |
| 5,443,130 A | * | 8/1995 | Tanaka et al. ............. 180/65.6 |
| 5,472,387 A | * | 12/1995 | Kamlukin ............... 475/339 X |
| 5,487,438 A | | 1/1996 | Kinoshita |
| 5,722,501 A | * | 3/1998 | Finch et al. ........... 180/65.6 X |
| 5,751,081 A | * | 5/1998 | Morikawa ............... 475/284 X |
| 5,804,935 A | | 9/1998 | Radev |
| 6,080,077 A | * | 6/2000 | Kamlukin ................... 475/339 |

* cited by examiner

DRIVE MECHANISM FOR A VEHICLE, ESPECIALLY A MULTILANE ELECTROMOBILE

CROSS-REFERENCE TO RELATED APPLICATIONS

This is a U.S. National Stage Application of International Application No. PCT/AT99/00006 filed Jan. 11, 1999 and claims priority under 35 U.S.C. § 119 of Austrian Patent Application No. A59/98, filed on Jan. 16, 1998.

BACKGROUND OF THE INVENTION

1. Field of the Invention

The invention relates to an electric drive for a motor vehicle, in particular for a multi-track electromobile.

2. Discussion of Background Information

Such types of electric drives are being used more and more in twin-track motor vehicles, in both road and commercial vehicles. The usual design uses mainly two independent electric motors, which are geared down by a spur gear or planet gear so that the motors can run at a much higher speed than the drive gears. In this way the structural volume and the weight of the driving unit can be reduced. A considerable disadvantage however is the great expense of the individual parts.

Thus DE 26 06 807 B describes an electric motor with two side output, in the stators of which two mechanically and electrically independent rotors are excited jointly by the stator, whereby the rotors are positioned so that no end shield is necessary for the rotor bearing opposite the respective output side.

In DE 42 36 093 A a drive system for an electric vehicle is described, which comprises several motors and reducing gears with planet gear devices, which are connected in a force transmitting way between the motors and the gears of the electric vehicle, whereby the improvement is that the motors and gears are arranged coaxially, so that they can be arranged coaxially between the right and left wheel of the electric vehicle. Here all of the described driving components are arranged in a housing. By means of a suitable choice of force transmission by means of the gear devices the torque distribution to the wheel axes can be influenced advantageously.

Likewise DE 44 21 425 C describes the drive of a road vehicle with an electrical drive unit in which two separately functioning units each with an electric motor and a gear arranged facing the respective drive gear, designed as a spur gear with an output shaft arranged eccentric to the axis of rotation of the electric motor or as a planet gear, act on the drive wheels of a vehicle axis. Electric motors, gears and output shaft bearing are thus mounted on a common support member.

The disadvantage of the above described conventional drive units is the use of two mechanically and electrically independent electric motors, whereby for each drive wheel more or less the same expense is required, as a gear is also assigned to each drive wheel.

SUMMARY OF THE INVENTION

An aspect of the invention is to create an electric drive for a motor vehicle, which on the one hand avoids the disadvantages of the aforementioned drives and on the other hand is easy to assemble and meets the requirement of independent rotational speeds for the left and right drive gear of an axis.

The electric drive according to the invention is characterised in that a fixed housing is provided for the vehicle construction or for the vehicle frame, whereby in this housing a motor frame with a stator and a rotor provided in the motor frame are rotatably mounted respectively, and the motor frame and the rotor for work output rotate in opposite directions, whereby one drive line is connected with the rotor or with the motor frame and the rotational movement of the rotor or the motor frame is connected by a transmission device with the drive and output rotating in the same direction and a second drive line is connected with the motor frame or with the rotor, and the rotational movement of the motor frame is connected with the rotor and the rotational movement of the motor frame or the rotor is transmitted by a transmission device with a drive and output rotating in opposite directions. With the invention it is possible for the first time to create a drive, which is arranged between the left and the right drive wheel, which fulfills the differential function and takes up so little space that a rigid coaxial connection between the gear axes and the drive is possible without reducing the ground clearance of the vehicle to an impermissible extent. The invention is based on the fact that in every drive engine, which provides its mechanical power by means of a rotational movement, the torque on the output shaft is equal to the torque at which the engine has to be supported relative to its environment. In the conventional design with a fixed engine thus the driving power is provided exclusively by the moving output shaft. The invention however aims to achieve a branching out of output to two drive lines in order to accommodate the conditions of the vehicle drive. This can be managed according to the invention in that on the one hand the output shaft performs a rotational movement, for example the rotor, via the first drive line, on the other hand the motor frame also performs a rotational movement in an opposite direction to the rotational direction of the output shaft via the second drive line. A work output of both drive lines is achieved if the rotational movement is in the same direction as the occurring torque which is necessarily the case in the arrangement according to the invention. By Electro magnetic generation of torque, which on the one hand is picked up as an action torque on the output shaft and on the other hand exists as a reaction torque on the motor frame, there is no mechanical connection between these two parts of the arrangement, which prevents the free rotatability of both parts. In a drive for a road vehicle it is thus necessary, that the work output of the drive gears is performed with the same directional rotational movement of the right and left gear. This achieved by the drive according to the invention.

According to an embodiment variant, the motor frame is mounted by roller bearings in the housing that are in particular aligned with a shaft of the rotor. Thus, the motor frame is mounted in the housing. It is an advantage that a simple construction is possible, which ensures economical production. The motor frame can be mounted on both sides in the housing in such a way that the shaft end of the motor frame extends into the transmission device of the second drive line. By the possible short support length between the bearings, high motor speeds are possible without mechanical resonances occurring.

A further embodiment variant is provided in that the motor frame on the one hand is mounted on the shaft of the rotor and on the other hand in the housing. Thereby, a compact construction is possible.

According to another aspect of the invention, the motor-frame is mounted rotatably in the housing aligned with the shaft of the rotor having a shaft end for the bearing. Thereby, it is also ensured that both the output shaft via the rotor, and the motor frame can perform any rotational movement. As in the drive according to the invention the output is branched preferably to both sides of the electric motor corresponding bearings are provided. It is also advantageous that on the bearing no high centrifugal forces occur and relatively small bearing diameters are used.

According to another embodiment the rotor is mounted on the one hand in the housing of the drive and on the other hand in the rotating motor frame, in such a way that the shaft end of the rotor extends into the transmission device of the first drive line. In this way advantageous short paths for the torque transmission are provided.

According to a special design the drive line drives gear shafts via the transmission device. In this way it is possible advantageously to equip motor vehicles with the drive according to the invention. Thus it is possible to produce smaller and medium sized vehicles, in particular communal vehicles, economically.

The additional special design according to the present invention, the transmission devices are planet gears, whereby the rotor is securely connected via the shaft or the motor frame with a planet cage of the assigned planet gear, and moves a planet axis of at least one planet gear set. Therefore, the invention has the almost indispensable advantage for a motor vehicle that the differential function is fulfilled in the simplest manner.

For the drive device according to the invention apart from the described transmission device also spur gear, bevel gear and worm gear transmission devices are suitable which on the one hand ensure the necessary speed translation to slow between the drive shaft and gear shafts and on the other hand can obtain a reversal in rotational direction inside the transmission device.

The design according to another aspect of the present invention, the rotational movement of the rotor via the shaft or the rotational movement of the motor frame moves the planet axis at least of a planet gear set, which includes at least two rotation-fast connected gears, the axes of rotation of which rotate rigidly coupled about the axis of rotation of the shaft or the motor frame, and in that one gear of the planet gear set meshes with a sun gear arranged rotation-fast with the housing concentric to the shaft or motor frame axis, and an additional gear of the planet gear set meshes with a sun gear arranged concentrically to the shaft or motor housing, which sun gear drives the assigned gear shaft, whereby the sun gear assigned to the housing has a different diameter to the sun gear assigned to the gear shaft. This is advantageous as in one transmission step the necessary transmission between the drive and gear shags can be achieved.

According to an advantageous development, in one drive line, the sun gear assigned to the housing has a smaller diameter the sun gear assigned to the gear shaft and in the other drive line the sun gear assigned to the housing has a greater diameter than the sun gear assigned to the gear shaft. With a fixed rotational diameter of the planet sets, the transmission ratio is formed exclusively from the diameter of the larger sun gear and the difference of the diameter of the two sun gears. The desired direction of rotation of the gear shafts is obtained however with a given transmission ratio by the arrangement of the larger sun gear either fixed to the motor vehicle or connected with the gear shafts. The arrangement of the planet gears is determined necessarily by the required engagement ratios.

The design according to another aspect of the present invention, the transmission devices have the same transmission ratio. It is advantageous, as with the vehicle drive in most cases it is preferable, if at the same speed of the drive gears, for example when driving in a straight line, the drive output to the same parts is passed on to the drive gears. This is achieved by the arrangement according to the invention by having the same transmission ratios of the transmission devices for both drive lines.

The design according to another aspect of the present invention, the transmission devices have a transmission ratio, which corresponds to the ration of the diameters of the fixed sun gears. It has the advantage that any possible distribution of output to the drive lines is conceivable, when the transmissions of the gears are set in a corresponding ratio relative to one another.

The development according to to another aspect of the invention, the transmission device is designed in two stages, whereby a planet axis rotates with the shaft or with the motor frame, on which a planet gear set with three relatively fixed gears is rotatably mounted, and the planet gear set on the one hand is in arrangement with freely rotatable sun gears, which are alternatively securable by a braking device and on the other hand with the sun gear assigned to the gear shaft. It is advantageous, in that an additional sun gear that can be coupled optionally rotation fast relative to the vehicle a second transmission stage can be connected.

According to a further design, the planet cage is provided on the output side with a surface in particular with a conical frictional surface, against which a brake disc mounted rotation-fast relative to the housing is activated by an electromagnetic activating device. With this advantageous design a considerable simplification of the entire axial construction can be achieved, if for each drive line a magnetically operated braking device is provided, in which a ring fixed relative to the motor vehicle, the frictional surface of which can be designed to be conical to increase the braking torque, acts on a corresponding opposite surface on the planet cage. As the planet cage runs at the high speed of the motor, the applied braking torque is increased by the transmission of the gear, so that a much greater braking torque acts on the gear shafts. The brake can be designed in such a way that that the friction ring in a currentless state of the activating magnet is forced by sprig force against the planet cage, whereby the function of a hand brake is achieved By metering the application of the magnetic force of the activating magnet the described braking device can also be used as a pedal brake.

It is also possible however to provide a friction surface, which at the same time acts on the motor frame on the one hand and on a part of the transmission device of the rotor drive line coupled with the rotor rotation on the other. By such a braking device both drive lines can be decelerated simultaneously.

According to a design of another aspect, a mechanical brake is provided, which brakes the rotational movement of the motor frame/,and the rotational movement of the rotor, in particular simultaneously. There is a structural advantage in that in a normal case, that is with equal deceleration of both drive lines, no free reaction torque occurs which would have to be supported on the housing.

Another aspect of the invention provides a mechanical brake that acts on the outer periphery of the motor frame or on the outer periphery of the planet cage connected with the shaft. This aspect is also advantageous, as by the action of the brake on the fast rotating components the torque is increased on the gear shafts by the transmission ratio.

According to still a further aspect of the invention, the mechanical brake is in particular, a divided or slotted ring.

This design has proved advantageous as a simple component is used as a brake.

A design according to another aspect of the present invention, the mechanical brake can be activated by a cable pull. With this design, it is also possible as also in this case only the simplest mechanical components can be used, Additionally, other aspects of the present invention include a mechanical brake that can be activated magnetically, in particular, by a lifting magnet on the cable pull. This design is advantageous, because a with low activating forces a magnetic activation is entirely possible.

According to a special design for electromechanical transduction an asynchronous machine with a squirrel cage rotor is provided the rotational filed of which is generated by frequency control and the current is supplied by slip rings on the periphery of the motor frame. As with the drive according to the invention the motor frame is mounted rotatably on the associated output shaft, the supply of current to the motor must be made via slip rings on the periphery of the motor frame. For the electromechanical transduction preferably the principle of the asynchronous machine with squirrel cage rotor is suitable, the rotational field of which is generated with driving speed dependent frequency control by electronic commutation. However any kind of electric driving machine is conceivable in which a torque is produced between the stator and rotor.

In another aspect of the present invention, the housing with the motor frame and the rotor and the transmission devices and the gear shafts with their bearing form a standard component. There are economical advantages to the formation of a standard component, which extend from the manufacture, stock keeping of spare parts to sales. Furthermore, the bearing of the output side sun gears of the transmission devices can be such that it permits the accommodation of gear forces, so that no additional axial bearing is necessary. However it is also possible to attach articulated shafts, in order to reduce the unsprung mass of the motor vehicle, and if necessary to increase the ground clearance between the drive gears.

According to an aspect of the present invention, an electric drive for a motor vehicle having a vehicle structure or vehicle frame is provided including a housing adapted to be fixed relative to the vehicle structure or vehicle frame, a motor frame rotatably mounted within the housing, and a stator and rotor being mounted for relative rotation and being located within the housing, the motor frame and the rotor arranged to rotate in opposite directions for work output. The invention further includes a first driveline being connected to one of the rotor or the motor frame, wherein rotational movement of the one of the rotor or the motor frame is transmitted through a first transmission device coupled to the first driveline such that a first output of the first transmission device rotates in a same direction as the rotational movement of the one of the rotor and the motor frame; and a second driveline connected to the other of the rotor or the motor frame, wherein rotational movement of the other of the rotor or motor frame is transmitted through a second transmission device coupled to the second driveline such that a second output of the second transmission device rotates in a direction opposite the rotational movement at the other of the rotor and the motor frame, wherein each of the first and second transmission devices comprises planet gears including a planet cage and at least one planet gear set, whereby one of the rotor or the frame is connected via a shaft of the rotor or the motor frame, respectively, with the planet cage and move a planet axis of the at least one planet gear set.

According to another aspect of the present invention, the electric drive is used in a multi-track electromobile. In another aspect of the present invention, the motor frame is mounted by roller bearings in the housing. According to a further aspect of the present invention, the roller bearings are aligned with the shaft of the rotor. In another aspect of the present invention, the motor frame is mounted one of on the shaft of the rotor or on the housing.

According to a still further aspect of the present invention, the motor frame, which is rotatably mounted in the housing has a shaft end adapted for a bearing that is aligned with the shaft of the rotor. According to another aspect of the invention, the rotor is mounted one of in the housing or in the motor frame. Further aspects of the invention include wherein the first driveline drives a first gear shaft connected to the first transmission device and the second driveline drives a second gear shaft connected to the second transmission device.

According to other aspects of the present invention the housing, the motor frame, the rotor, the first and second transmissions devices, the first and second gear shafts and associated bearings for the first and second gear shafts form a standard component package.

According to an aspect of the present invention, the at least one planet gear set comprises at least two sun gears and at least a first and second gear having axes of rotation of which rotate rigidly about an axis of rotation of the shaft of the rotor or of the motor frame, wherein the first gear is arranged to mesh with one of the sun gears, which is arranged to be non-rotational with respect to the housing and concentric to the shaft of the rotor or to a motor frame axis, and the second gear is arranged to mesh with the other sun gear, which is arranged concentrically to the shaft of the rotor or the motor housing axis, the other sun gear being arranged to drive a respective gear shaft, wherein the one sun gear has a different diameter than that of the other sun gear.

According to another aspect of the present invention, the first driveline which is coupled to a first gearshaft, the one sun gear having a smaller diameter than other sun gear, which is coupled to the first gear shaft; and with the second drive line which is coupled to a second gear shaft, the one sun gear has a greater diameter than the other sun gear, which is coupled to the second gearshaft.

In another aspect of the present invention, the first and second transmission devices have a transmission ratio which corresponds to a ratio of diameters of the at least two sun gears. According to a further aspect of the present invention, the first and second transmission devices have a same transmission ratio. In another aspect of the present invention the first and second transmission devices have two stages, such that the planet axis rotates with the shaft of the rotor or with the motor frame, and the at least one planet gear set comprises three rotatably mounted gears which are positionally fixed relative to each other, the at least one planet gear set being in engagement with freely rotatable sun gears, which are alternatively securable by a braking device, and being in engagement with a another sun gear assigned to a gear shaft.

According to a still further aspect of the present invention, the planet cage is provided on an output side and includes a surface positionable against a brake disc, which is mounted to be non-rotatable relative to the housing acts, is activated by an electromagnetic activating device. In another aspect of the present invention, the surface is a conical frictional surface. According to an aspect of the present invention, a mechanical brake is arranged to brake rotational movement of the motor frame and rotational movement of the rotor.

According to another aspect of the present invention, the mechanical brake acts on an outer periphery of the motor frame or on an outer periphery oft he planet cage connected with a shaft of the rotor. In another aspect of the present invention, the mechanical brake operates simultaneously with respect to the rotational movement of the motor frame and the rotational movement of the rotor. According to a further aspect of the present invention, the mechanical brake is a divided or slotted ring.

In another aspect of the present invention, the mechanical brake can be activated by a cable pull. According to still a further aspect of the present invention, the mechanical brake can be activated magnetically. Further aspects of the invention include wherein the mechanical brake can be activated magnetically by a lifting magnet on a cable pull.

According to other aspects of the present invention, wherein for electromechanical transduction, an asynchronous machine with a squirrel-cage rotor is provided, wherein a rotational field of which is generated by frequency control and current is supplied by slip rings on a periphery of said motor frame.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

First of all it is noted that in the various described embodiments the same parts are allocated the same reference numbers or the same component names, whereby the disclosures contained throughout the description can be applied by analogy to the same parts with the same reference numbers or same component names. Also position details given in the description, such as e.g. top, bottom, side etc. relate to the Figure being described at the time and with a change of position should be transferred accordingly to the new position. Furthermore, individual features or combinations of features from the shown and described different embodiments can represent, independent, inventive solutions or solutions according to the invention.

Figure 1:
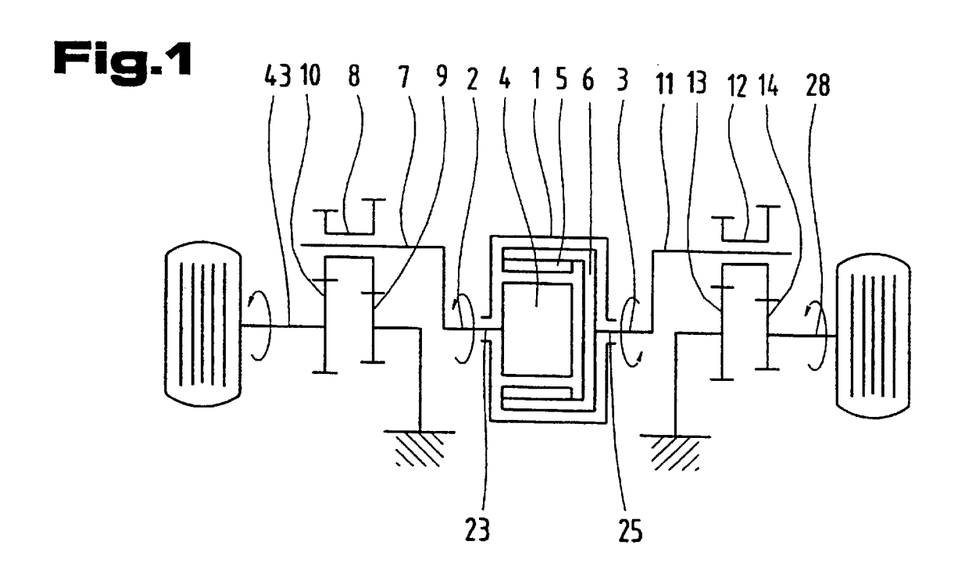
FIG. 1 a schematic view of the drive.

According to FIG. 1 the electric drive comprises a housing 1 that is fixed relative to the motor vehicle, from which on both sides a first drive line 2 and a second drive line 3 are guided. The torque of the first drive line 2 is provided by a shaft 25 of a freely rotatably mounted rotor 4, the torque of the second drive line 3 is provided by a stator 5, which is secured in a motor frame 6. The motor frame 6 is securely connected to a shaft end 23 of the second drive line 3. The rotational torque of the first drive line 2 moves a planet axis 7 of a planet gear set 8, which on the one hand engages with a sun gear 9 of the transmission device of the first drive line 2 fixed relative to the motor vehicle, and on the other hand with a sun gear 10 of the first drive line 2 rotatable with a gear shaft 43. In the transmission device of the first drive line 2 the fixed sun gear 9 is smaller than the rotatable sun gear 10, whereby the drive and output shaft of the transmission device are rotated in the same direction. Furthermore, the rotational movement of the second drive line 3 moves a planet axis 11 of a planet gear set 12, which on the one hand engages with a sun gear 13 of the transmission device of the second drive line 3 fixed relative to the motor vehicle and on the other hand with a sun gear 14 of the second drive line 3 rotatable with a gear shaft 28. In the transmission device of the second drive line 3 the fixed sun gear 13 is larger than the rotatable sun gear 14, whereby an opposite rotational movement of the drive and output shaft of the transmission device is effected.

Figure 2:
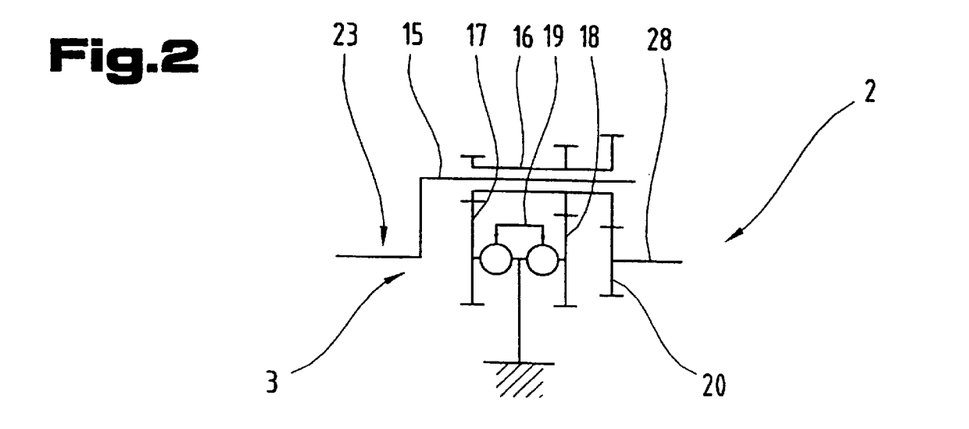
FIG. 2 a two stage design of the transmission device.

FIG. 2 shows a schematic view of a two stage transmission device of a drive line 3, whereby the transmission device of the second drive line 2 has to be modified accordingly, in that a planet axis 15 rotates with the shaft end 23 on which a planet gear set 16 with three gears is rotatably mounted. The planet gear set 16 is on the one hand in engagement with freely rotatable sun gears 17, 18, which can be secured optionally or alternatively relative to the motor vehicle by a braking device 19, and on the other hand is in engagement with a sun gear 20, which is connected with the gear shaft 28.

Figure 3:
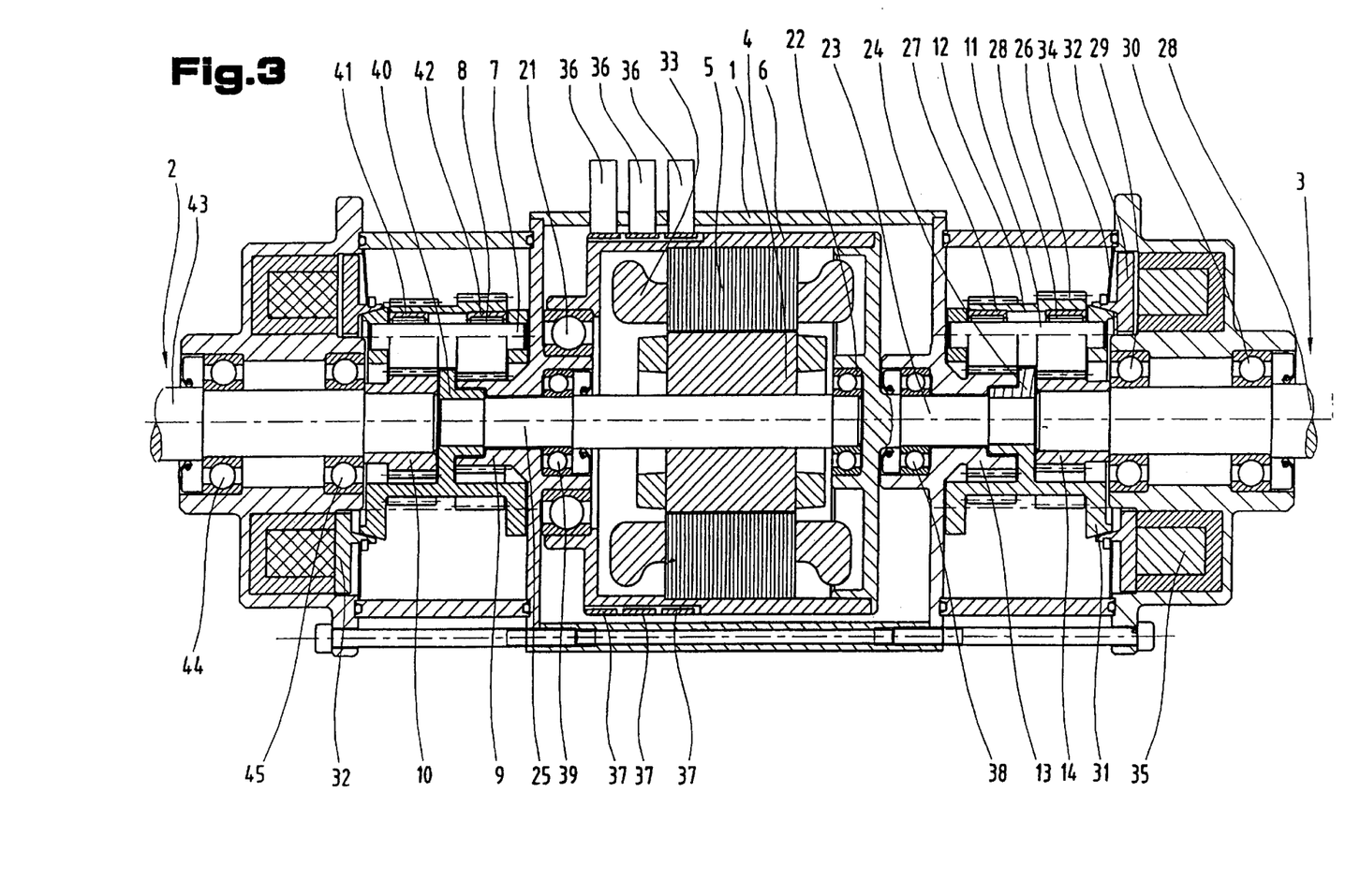
FIG. 3 an electric drive in cross section.

According to FIG. 3 the electric drive comprises the fixed housing 1, in which by means of roller bearings 21, 22 the freely rotatable motor frame 6, in which the stator of the electric motor is secured, is mounted. The shaft end 23 firmly connected with the motor frame 6 is securely connected with a planet cage 24 of the transmission device, on the planet axis 11 of which the planet gear set 12 is mounted freely rotatably on roller bearings 26, 27. The planet gear set 12 engages on the one hand in the sun gear 13 fixed relative to the housing 1 and on the other hand in the sun gear 14 which is secured onto the right gear shaft 28. The gear shaft 28 is mounted on two roller bearings 29, 30 rotatably relative to the housing 1. The planet cage 24 is designed on the output side with a conical frictional surface 31, on which a brake disc 32 mounted rotation-fast relative to the housing 1 can rest. The brake disc 32 is in a position of rest forced by a disc spring 34 axially against the conical frictional surface 31 of the planet cage 24. By means of an electromagnetic activation device 35 the axial force of the disc spring 34 can be overcome and thereby the brake can be lifted.

The supply of electric power to an excitation winding 33 of the stator 5 is performed via carbon 36 on slip rings 37 on the rotatable motor frame 6. The left drive line 2 is formed by the rotor 4 of the electric motor, which is rotatably mounted on the right side in the motor frame 6 by a roller bearing 38 and on the left side in the housing 1 also by a roller bearing 39, and is securely connected with a planet cage 40 of the left transmission device, on the planet axis 7 of which the planet gear set 8 is mounted freely rotatably on roller bearings 41, 42. The planet gear set 8 engages on the one hand in the sun gear 9 fixed relative to the housing 1, and on the other hand in the sun gear 10, which is secured on the right gear shaft 43. The gear shaft 43 is mounted on two roller bearings 44, 45 rotatably relative to the housing 1. The braking device with the brake disc 32 of the left drive line 2 is designed corresponding to the right drive line 3. The fixed sun gear 9 of the left drive line 2 is the same size as the rotatable sun gear 14 of the right drive line 3. The same applies to the sun gear 13 and sun gear 10.

As the rotational diameter of the planet axes 7 and 11 is of equal size, the transmission ratios for the left and right transmission device are produced.

Figure 4:
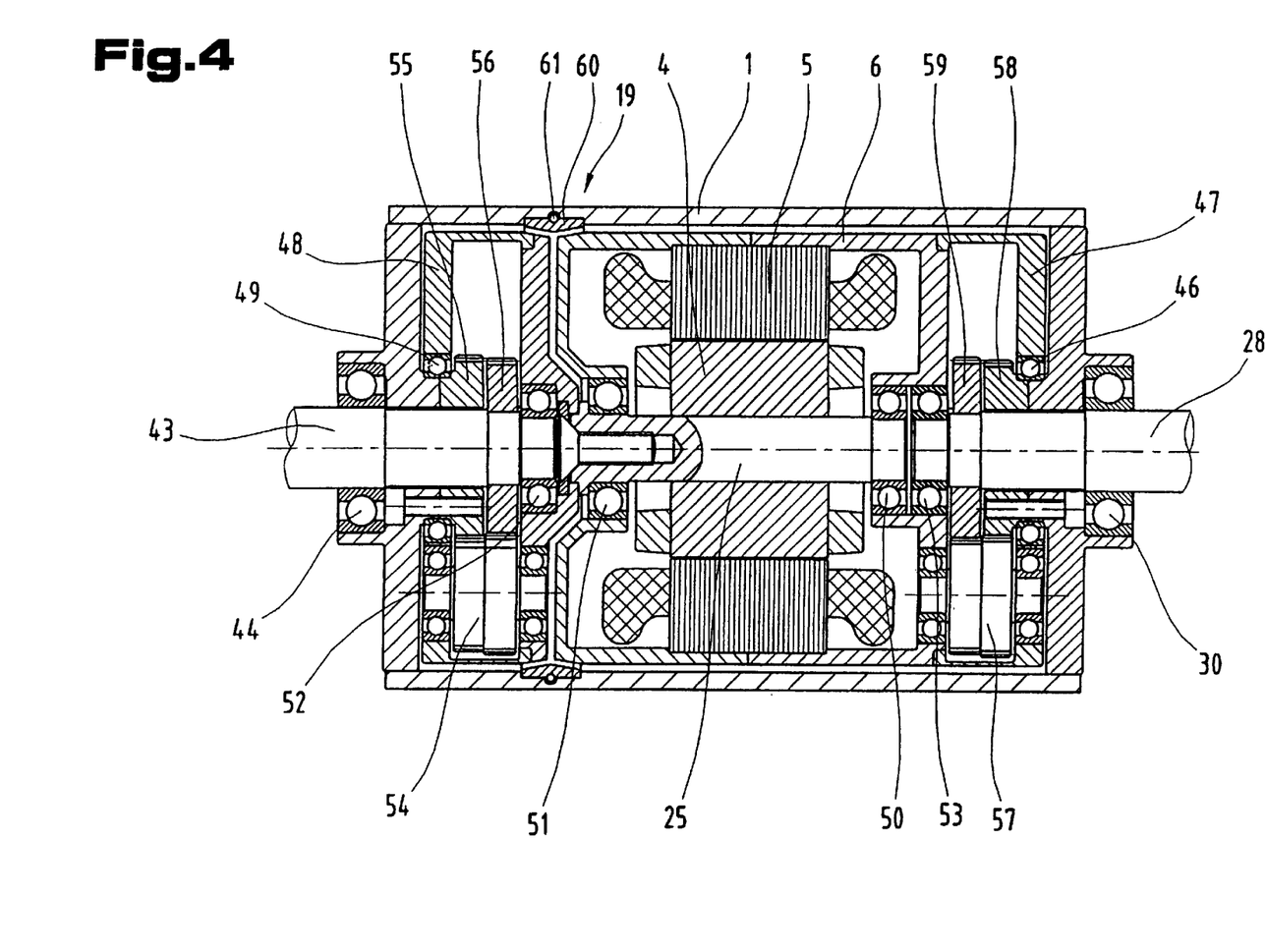
FIG. 4 a further variant of a drive in cross section.

According to FIG. 4 the electric drive comprises the fixed housing 1, in which by means of a roller bearing 46 the motor frame 6, which is securely connected to the planet cage 47, is mounted on one side. In the motor frame 6 the stator 5 and the rotor 4 with its shaft 25 are also provided. The rotor 4 is in turn securely connected with a planet cage 48, which is mounted by a roller bearing 49 in the housing 1. The second bearing of the rotor 4 is performed by a roller bearing 50 which is arranged in the motor frame 6. The second bearing of the motor frame 6 is made by a roller bearing 51 which is positioned on the shaft 25.

The gear shaft 43 is on the one hand mounted by the roller bearing 44 arranged in the housing 1 and on the other hand by a roller bearing 52 provided in the planet cage 48. The gear shaft 28 is mounted by the roller bearing 30 arranged in the housing 1 and a roller bearing 53 provided in the motor frame 6.

The planet gear for the gear shaft 43 with its planet cage 48 comprises a planet gear set 54 and a fixed sun gear 55 securely connected to the housing 1 and a sun gear 56 securely connected to the gear shaft 42. The planet gear for the gear shaft 28 with its planet cage 47 comprises technically analogously a planet gear set 57 and a fixed sun gear 58 securely connected with the housing 1 and a sun gear 59 securely connected with the gear shaft 28. The rotational movement of the rotor 4 or the motor frame 6 is transmitted by the planet gear, as in the embodiment according to FIG. 3, to the gear shafts 28 and 43.

As a braking device 19 a mechanical brake 60 is provided which acts on the outer periphery of the motor frame 6 or on the outer periphery of the planet cage 48 connected with the shaft 25. Said mechanical brake 60 is a divided ring which is activated by a cable pull 61.

Finally, for form's sake it is noted that for a better understating of the structure of the drive, the latter and its components are illustrated partly untrue to scale and/or are enlarged and/or made smaller.

The problem forming the basis of the separate solutions according to the invention can be taken from the description.

Above all the individual embodiments shown in FIGS. 1; 2; 3; 4 can form the subject matter of independent solutions according to the invention. The problems and solutions relating thereto according to the invention are to be taken from the detailed descriptions of these figures.

LIST OF REFERENCE NUMBERS 1. housing
2. drive line
3. drive line
4. rotor
5. stator
6. motor frame
7. planet axis
8. planet gear set
9. sun gear
10. sun gear
11. planet axis
12. planet gear set
13. sun gear
14. sun gear
15. planet axis
16. planet gear set
17. sun gear
18. sun gear
19. braking device
20. sun gear
21. roller bearing
22. roller bearing
23. shaft end
24. planet cage
25. shaft
26. roller bearing
27. roller bearing
28. gear shaft
29. roller bearing
30. roller bearing
31. frictional surface
32. brake disc
33. excitation winding
34. disc spring
35. actuating device
36. carbon
37. slip ring
38. roller bearing
39. roller bearing
40. planet cage
41. roller bearing
42. roller bearing
43. gear shaft
44. roller bearing
45. roller bearing
46. roller bearing
47. planet cage
48. planet cage
49. roller bearing
49. roller bearing
51. roller bearing
52. roller bearing
53. roller bearing
54. planet gear set
55. sun gear
56. sun gear
57. planet gear set
58. sun gear
59. sun gear
60. brake
61. cable pull

What is claimed is:

1. An electric drive for a motor vehicle having a vehicle structure or vehicle frame, said electric drive, comprising:

a housing adapted to be fixed relative to the vehicle structure or vehicle frame;

a motor frame rotatably mounted within said housing, a stator and rotor being mounted for relative rotation and being located within said housing, said motor frame and said rotor arranged to rotate in opposite directions for work output;

a first driveline being connected to one of said rotor or said motor frame, wherein rotational movement of said one of said rotor or said motor frame is transmitted through a first transmission device coupled to said first driveline such that a first output of said first transmission device rotates in a same direction as said rotational movement of said one of said rotor and said motor frame; and a second driveline connected to the other of said rotor or said motor frame, wherein rotational movement of said other of said rotor or motor frame is transmitted through a second transmission device coupled to said second driveline such that a second output of said second transmission device rotates in a direction opposite said rotational movement at said other of said rotor and said motor frame;

wherein each of said first and second transmission devices comprises planet gears including a planet cage and at least one planet gear set, whereby one of said rotor or said frame is connected via a shaft of said rotor or said motor frame, respectively, with said planet cage and move a planet axis of said at least one planet gear set.

2. The electric drive according to claim 1, wherein said electric drive is used in a multi-track electromobile.

3. The electric drive according to claim 1, wherein said motor frame is mounted by roller bearings in said housing.

4. The electric drive according to claim 3, wherein said roller bearings are aligned with said shaft of said rotor.

5. The electric drive according to claim 1, wherein said motor frame is mounted one of on said shaft of said rotor or on said housing.

6. The electric drive according to claim 5, wherein said motor frame, which is rotatably mounted in said housing has a shaft end adapted for a bearing that is aligned with said shaft of said rotor.

7. The electric drive according to claim 1, wherein said rotor is mounted one of in said housing or in said motor frame.

8. The electric drive according to claim 1, wherein said first driveline drives a first gear shaft connected to said first transmission device and said second driveline drives a second gear shaft connected to said second transmission device.

9. The electric drive according to claim 1, wherein said housing, said motor frame, said rotor, said first and second transmissions devices, said first and second gear shafts and associated bearings for said first and second gear shafts form a standard component package.

10. The electric drive according to claim 1, wherein said first and second transmission devices have a same transmission ratio.

11. The electric drive according to claim 1, wherein for electromechanical transduction, an asynchronous machine with a squirrel-cage rotor is provided, wherein a rotational field of which is generated by frequency control and current is supplied by slip rings on a periphery of said motor frame.

12. An electric drive for a motor vehicle having a vehicle structure or vehicle frame, said electric drive, comprising:
a housing adapted to be fixed relative to the vehicle structure or vehicle frame;
a motor frame rotatably mounted within said housing,
a stator and rotor being mounted for relative rotation and being located within said housing, said motor frame and said rotor arranged to rotate in opposite directions for work output;
a first driveline being connected to one of said rotor or said motor frame, wherein rotational movement of said one of said rotor or said motor frame is transmitted through a first transmission device coupled to said first driveline such that a first output of said first transmission device rotates in a same direction as said rotational movement of said one of said rotor and said motor frame; and
a second driveline connected to the other of said rotor or said motor frame, wherein rotational movement of said other of said rotor or motor frame is transmitted through a second transmission device coupled to said second driveline such that a second output of said second transmission device rotates in a direction opposite said rotational movement at said other of said rotor and said motor frame;
wherein each of said first and second transmission devices comprises planet gears including a planet cage and at least one planet gear set, whereby one of said rotor or said frame is connected via a shaft of said rotor or said motor frame, respectively, with said planet cage and move a planet axis of said at least one planet gear set, and
wherein said at least one planet gear set comprises at least two sun gears and at least a first and second gear having axes of rotation of which rotate rigidly about an axis of rotation of said shaft of said rotor or of said motor frame, wherein said first gear is arranged to mesh with one of said sun gears, which is arranged to be non-rotational with respect to said housing and concentric to said shaft of said rotor or to a motor frame axis, and said second gear is arranged to mesh with the other sun gear, which is arranged concentrically to said shaft of said rotor or said motor housing axis, said other sun gear being arranged to drive a respective gear shaft, wherein said one sun gear has a different diameter than that of said other sun gear.

13. The electric drive according to claim 12, wherein with said first driveline which is coupled to a first gearshaft, said one sun gear having a smaller diameter than other sun gear, which is coupled to said first gear shaft; and
wherein with said second drive line which is coupled to a second gear shaft, said one sun gear has a greater diameter than said other sun gear, which is coupled to said second gearshaft.

14. The electric drive according to claim 12, wherein said first and second transmission devices have a transmission ratio which corresponds to a ratio of diameters of said at least two sun gears.

15. An electric drive for a motor vehicle having a vehicle structure or vehicle frame, said electric drive, comprising:
a housing adapted to be fixed relative to the vehicle structure or vehicle frame;
a motor frame rotatably mounted within said housing,
a stator and rotor being mounted for relative rotation and being located within said housing, said motor frame and said rotor arranged to rotate in opposite directions for work output;
a first driveline being connected to one of said rotor or said motor frame, wherein rotational movement of said one of said rotor or said motor frame is transmitted through a first transmission device coupled to said first driveline such that a first output of said first transmission device rotates in a same direction as said rotational movement of said one of said rotor and said motor frame; and
a second driveline connected to the other of said rotor or said motor frame, wherein rotational movement of said other of said rotor or motor frame is transmitted through a second transmission device coupled to said second driveline such that a second output of said second transmission device rotates in a direction opposite said rotational movement at said other of said rotor and said motor frame;
wherein each of said first and second transmission devices comprises planet gears including a planet cage and at least one planet gear set, whereby one of said rotor or said frame is connected via a shaft of said rotor or said motor frame, respectively, with said planet cage and move a planet axis of said at least one planet gear set, and
wherein said first and second transmission devices have two stages, such that the planet axis rotates with the shaft of said rotor or with said motor frame, and said at least one planet gear set comprises three rotatably mounted gears which are positionally fixed relative to each other, said at least one planet gear set being in engagement with freely rotatable sun gears, which are alternatively securable by a braking device, and being in engagement with another sun gear assigned to a gear shaft.

16. An electric drive for a motor vehicle having a vehicle structure or vehicle frame, said electric drive, comprising:

a housing adapted to be fixed relative to the vehicle structure or vehicle frame;

a motor frame rotatably mounted within said housing, a stator and rotor being mounted for relative rotation and being located within said housing, said motor frame and said rotor arranged to rotate in opposite directions for work output;

a first driveline being connected to one of said rotor or said motor frame, wherein rotational movement of said one of said rotor or said motor frame is transmitted through a first transmission device coupled to said first driveline such that a first output of said first transmission device rotates in a same direction as said rotational movement of said one of said rotor and said motor frame; and a second driveline connected to the other of said rotor or said motor frame, wherein rotational movement of said other of said rotor or motor frame is transmitted through a second transmission device coupled to said second driveline such that a second output of said second transmission device rotates in a direction opposite said rotational movement at said other of said rotor and said motor frame;

wherein each of said first and second transmission devices comprises planet gears including a planet cage and at least one planet gear set, whereby one of said rotor or said frame is connected via a shaft of said rotor or said motor frame, respectively, with said planet cage and move a planet axis of said at least one planet gear set, and wherein said planet cage is provided on an output side and includes a surface positionable against a brake disc, which is mounted to be non-rotatable relative to said housing acts, is activated by an electromagnetic activating device.

17. The electric device according to claim 16, wherein said surface is a conical frictional surface.

18. An electric drive for a motor vehicle having a vehicle structure or vehicle frame, said electric drive, comprising:

a housing adapted to be fixed relative to the vehicle structure or vehicle frame;

a motor frame rotatably mounted within said housing, a stator and rotor being mounted for relative rotation and being located within said housing, said motor frame and said rotor arranged to rotate in opposite directions for work output;

a first driveline being connected to one of said rotor or said motor frame, wherein rotational movement of said one of said rotor or said motor frame is transmitted through a first transmission device coupled to said first driveline such that a first output of said first transmission device rotates in a same direction as said rotational movement of said one of said rotor and said motor frame; and a second driveline connected to the other of said rotor or said motor frame, wherein rotational movement of said other of said rotor or motor frame is transmitted through a second transmission device coupled to said second driveline such that a second output of said second transmission device rotates in a direction opposite said rotational movement at said other of said rotor and said motor frame;

wherein each of said first and second transmission devices comprises planet gears including a planet cage and at least one planet gear set, whereby one of said rotor or said frame is connected via a shaft of said rotor or said motor frame, respectively, with said planet cage and move a planet axis of said at least one planet gear set, and wherein a mechanical brake is arranged to brake rotational movement of said motor frame and rotational movement of said rotor.

19. The electric device according to claim 18, wherein said mechanical brake acts on an outer periphery of said motor frame or on an outer periphery of said planet cage connected with a shaft of said rotor.

20. The electric drive according to claim 19, wherein said mechanical brake operates simultaneously with respect to the rotational movement of said motor frame and the rotational movement of said rotor.

21. The electric device according to claim 20, wherein said mechanical brake is a divided or slotted ring.

22. The electric device according to claim 20, wherein said mechanical brake can be activated by a cable pull.

23. The electric device according to claim 20, wherein said mechanical brake can be activated magnetically.

24. The electric device according to claim 23, wherein said mechanical brake can be activated magnetically by a lifting magnet on a cable pull.

* * * * *